United States Patent

[11] 3,614,043

| | | |
|---|---|---|
| [72] | Inventor | Michael H. Reagan<br>Dayton, Ohio |
| [21] | Appl. No. | 874,194 |
| [22] | Filed | Nov. 5, 1969 |
| [45] | Patented | Oct. 19, 1971 |
| [73] | Assignee | The United States of America as represented by the Secretary of the Air Force |

[54] RESTRAINING DEVICE FOR AIR DROP LOADS
1 Claim, 5 Drawing Figs.

[52] U.S. Cl. .................................................. 248/119 R,
24/230.5 R, 248/361 R
[51] Int. Cl. ............................................................ B60p 7/06
[50] Field of Search ........................................... 248/119,
361; 24/73 MC, 73 HH, 73 TH, 73 HR, 265 CD,
265 H, 230 BA, 230 BH, 230 CR, 230 FH, 230 CS,
230 TH, 230 TD, 230 SS, 230 PA, 230 TP; 294/74;
108/51

[56] References Cited
UNITED STATES PATENTS

| 1,973,624 | 9/1934 | Hanlon | 248/119 |
| 2,539,997 | 1/1951 | Graves | 248/361 A |
| 2,900,157 | 8/1959 | Anke | 248/119 |
| 2,913,216 | 11/1959 | Davis | 248/361 |
| 3,071,348 | 1/1963 | Huber | 248/361 |
| 3,280,438 | 10/1966 | Luketa | 24/230.5 CR |
| 3,343,862 | 9/1967 | Holmes | 24/230.5 |
| 3,377,044 | 4/1968 | Jackson et al. | 248/361 A |

FOREIGN PATENTS

| 3,785 | 11/1874 | Great Britain | 24/230.5 |
| 703,286 | 2/1965 | Canada | 108/51 |

*Primary Examiner*—Marion Parsons, Jr.
*Attorneys*—Harry A. Herbert, Jr. and Herbert H. Brown ABSTRACT: The disclosure relates to tiedowns for securing loads to a platform which can be carried on moving vehicles or dropped from a plane by parachute. These platforms, usually made of wood, are reinforced at their edges by lengths of angle iron or rails having openings along the upper leg for receiving the tiedowns. Strips of woven plastic webbing are used as the tiedown elements on account of its tensile strength and ability to yield under stress. The tiedown webbing is threaded through the eye of a clevis, the bolt of which passes through one of the openings in the longitudinally extending rail of the platform. At the load end, the webbing is received by a slot in an improved adaptor or webbing link. The lower edge of the slot has a curved shape so that the webbing can be looped around this surface without abrasion. From this point, the webbing is returned toward its starting point to form, in effect, two parallel lengths of the webbing with the clevis at one end of the double length and the adaptor at the other end. A belt tightener of standard design is inserted in one of these lengths. Each end of the webbing length, where the tightener is employed, is provided with a metal loop attachment sewn into the webbing material for detachably receiving the oppositely disposed hooks of the belt tightener. The adaptor has an opening therein for receiving the closed end link of a grab chain terminating in a load attachment hook which can be attached to one of the binding straps encircling the load or attached to a mechanical part of the load in any suitable manner.

INVENTOR.
MICHAEL N. REAGAN

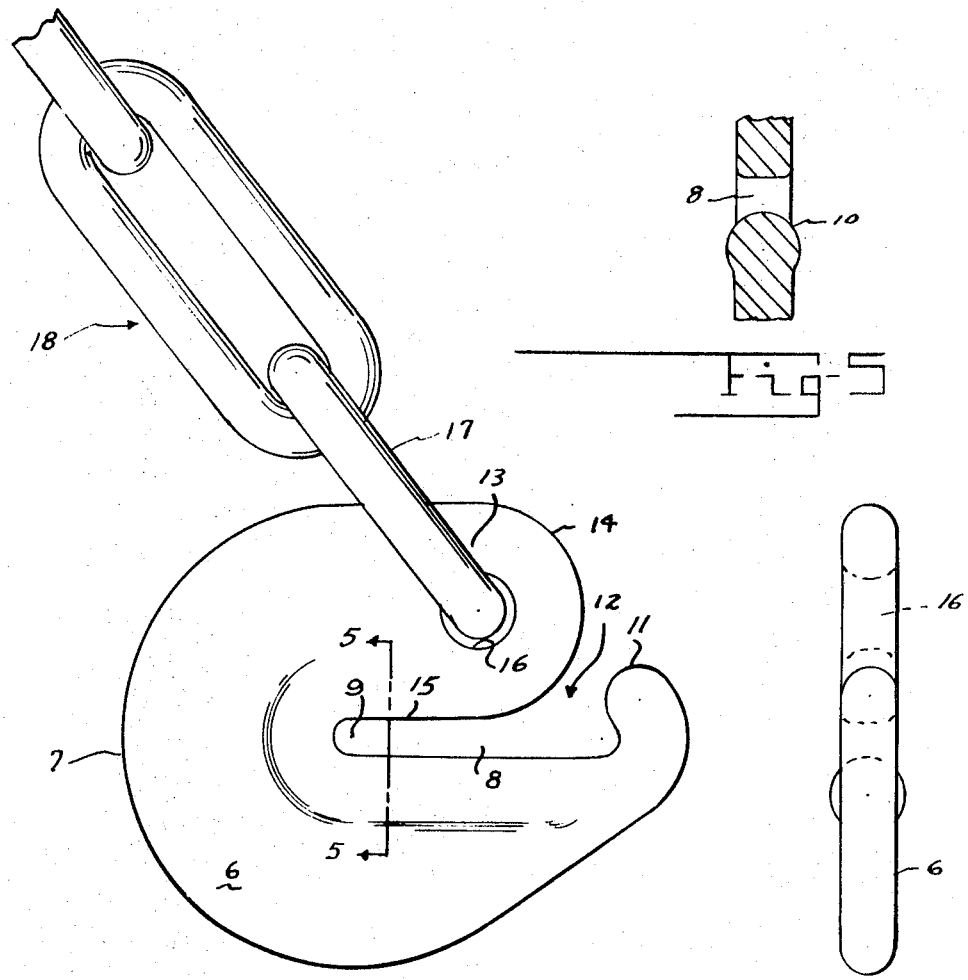

RESTRAINING DEVICE FOR AIR DROP LOADS

BACKGROUND OF THE INVENTION

When transporting vehicles, tanks and heavy rifles by air or rail, and more especially when an air drop is contemplated, the equipment must be supported on a sturdy platform made of wood with stiffening edges. The latter constitutes structural rails of angular configuration, one leg of which is bolted to the platform and the other is provided with openings for receiving the tiedown elements. It is the practice to employ webbing strips of plastic material, such as dacron or nylon, for these elements on account of their unusual tensile strength and resilient properties. Each strip, at the platform end, is usually received by the eyelet of a clevis, the bolt of which passes one of the openings in the rail. The other end of the double loop strip may be connected by a tie knot to any convenient part of the load which is normally a metal protuberance. However, the latter may have a rough or sharp-edged surface and the stress exerted on the platform by the extraction and holding parachutes may be sufficient to abrade one or more of the threads of the tiedown element, and thus impair its holding strength. In order to protect the webbing from being degraded in this manner, it has also been the practice to apply padding at the metal tiedown position. But, this padding operation is time consuming and results in a restraint attachment of uncertain strength. When the load has conveniently shaped metal fittings, a clevis and nut form of connection may serve as the point of attachment. While such element may provide a metal to metal connection and thus avoid impairment of the webbing, it requires disassembly to release the load and necessitates reassembly of the connection for the next load, a time-consuming operation.

SUMMARY OF THE INVENTION

An object of the invention is to provide a tiedown assembly employing strips of woven fabric material and providing a metal-to-metal point of connection between an air drop load and the strip.

Another object is to provide a tiedown assembly which employs strips of woven fabric and in which the strips, including the metal-to-metal point of attachment, can be instantly disconnected from the load, ready for reconnection to a second load being prepared for air drop.

These objects are attained in brief by providing an improved form of webbing hook having a rounded open ended slot for receiving one end of the webbing. The hook has an aperture for receiving the closed end link of a grab chain or other metal attachment which can be hooked on to a convenient part of the load, regardless of any sharp edges thereon.

BRIEF DESCRIPTION OF THE DRAWINGS OF THE PREFERRED EMBODIMENT

FIG. 3 depicts a plan view, enlarged, of the improved adaptor or webbing hook for receiving the upper loop of the fabric or tiedown material.

FIG. 4 is an elevational view of the adaptor.

FIG. 5 represents the section of a portion of the adaptor taken along line 5—5 of FIG. 3.

Figure 1:
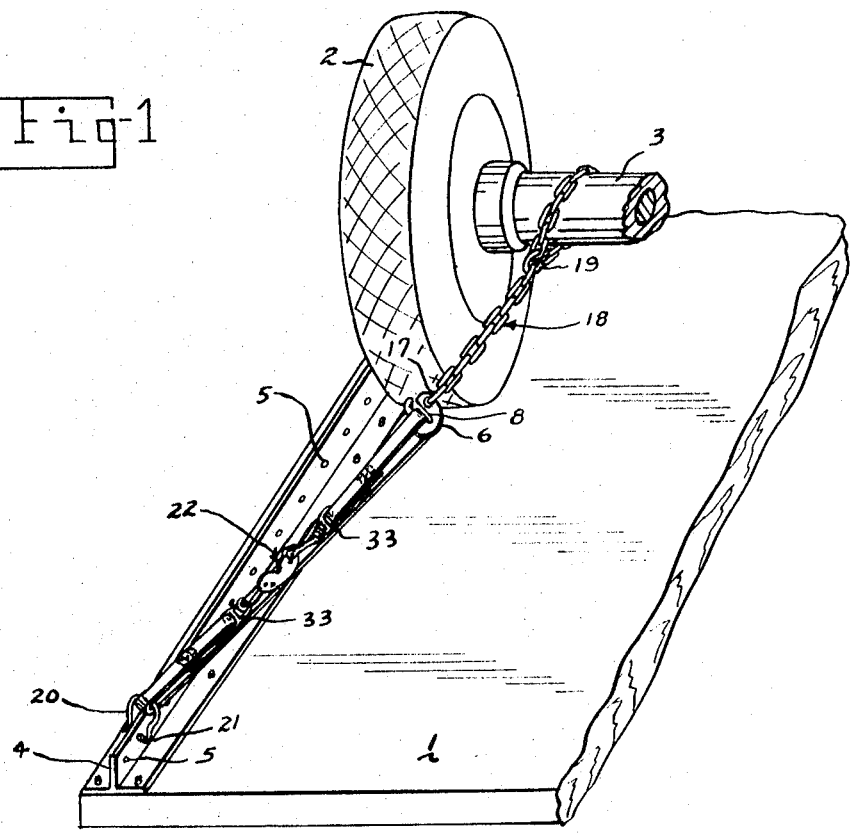
FIG. 1 is a perspective view of a tiedown assembly as applied to a typical load mounted on an air drop platform of standard character.

Referring to FIG. 1, reference character designates a platform, suitable for an air drop by parachute, and which carries a vehicular load typified as a rear wheel 2 and part of the shaft housing 3. The vehicle may represent a truck, tractor, tank or other equipment covered with tarpaulin which is held in place by straps or ropes, etc. It is necessary to hold the load rigidly on the platform to withstand the tremendous stresses brought about by pulling the load out of the rear of a plane by an extraction parachute, and then air dropped to a desired location by a cargo parachute. The platform 1 must be rigidly made, usually of heavy lumber and held in shape by angle irons or rails 4 positioned around the edges of the platform. These rails have openings 5 along the upper edge and preferably equally spaced, which openings serve as the lower tiedown points in order to secure the load firmly. The latter, particularly in the case of trucks, usually rests upon suitably spaced stacks of honeycomb cardboard which are wedged between the undercarriage of the truck and the heavy air drop platform. For firmly holding the load to the latter, stout webbing is employed, made of woven plastic material, such as nylon or dacron, and sometimes cotton, these materials having tremendous tensile strength but also allowing a small degree of yield which may prevent abrupt breakage under the heavy stress entailed in the air drop. However, it has been found that when webbing of this character makes a direct contact with the metal of a truck load for example, the holding power of the webbing may be weakened due to the relative movement between the webbing and the load at the point of tiedown. Even the cutting of a few threads by the rough edges on the load surface at the point of attachment, may be sufficient to degrade strength of the webbing.

Figure 2:
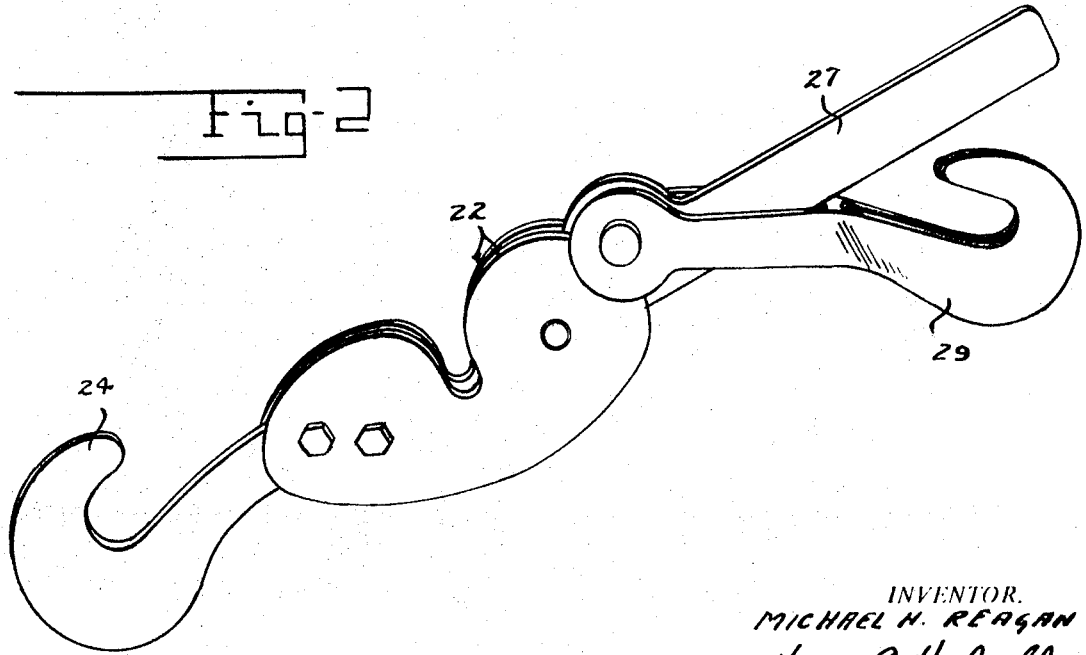
FIG. 2 represents in perspective a standard form of belt tightener that can be used to advantage in employing the invention.

Accordingly, I have devised a so-called "adaptor" or webbing link shown in FIGS. 3, 4 and 5 which avoids the necessity of a direct contact between the webbing and the metal part of the load, but instead, permits the use of a metal contact member at these places. In addition, the use of the adaptor makes it possible to disconnect the tiedown assembly from the load very quickly and without the slightest distortion of the webbing material. As shown, the adaptor comprises a flat metal member 6 having a semicircular end 7 with a slot 8 extending radially outward from the center point 9. The slot terminates at the center in a small radius and has a height, or width, as slidably but snugly to receive the webbing. The lower edge of the slot 8 is rounded to a semicircular shape as indicated at 10 in FIG. 5. The slot has a length (in the horizontal direction as shown) as to be slightly longer than the width of the webbing. The full length of the slot is accommodated by an upstanding knob 11 having a curvilinear shape and the lower edge of which merges into the curved outline of the end portion 7. The knob portion 11 extends upwardly and slightly toward the center, leaving a space 12 between it and the horizontal extension 13 which has a semicircular end 14. This extension forms the upper edge 15 of the slot. The space 12 is somewhat larger than the thickness of the slot 8 in order to permit the edgewise introduction or removal of the webbing to or from the slot, as will be apparent when the operation of the apparatus as a whole is described. There is an opening 16 at the center of the semicircular extension 13, this opening being of a size as to readily receive the closed end link 17 of the chain 18. This chain terminates in a grab hook 19 as can be seen in FIG. 1. At the lower end of the webbing assembly, as shown in FIG. 1, there is a bolted clevis 20 of standard type and in which the bolt 21 extends through one of the openings 5 in the rail. The clevis itself is formed of a large diametral eye portion which readily accommodates the webbing and has a circular cross section so as not to bite into the webbing when tension is applied to the assembly by a belt tightener which is of standard construction and is shown in FIG. 2. Only a short description of the bare details of the tightener appears necessary. Two metal plates 22 are spaced from one another in firm relation and each has two circular portions separated by an inwardly extending recess. A hook 24 is secured between the plates at one of the circular portions. The other circular portion has a pin at the center which serves as a fulcrum for a lever 27. The latter can be swung about its pivot in the space between the plates. There is a hook member 29 having a split shank which is swingable about a riveted pin. Thus, as the lever 27 swings the split hook member is caused to move about a circular path and causes the hook to move toward or away from the opposite hook 24. Large movements of the hook 26, with respect to the stationary hook 24, can be obtained so as to apply considerable tension between the hooks.

The tightener is inserted between the two ends of the webbing, i.e., in the upper link as shown in FIG. 1. The connection between these ends and the tightener is obtained by means of a large eyelet member 33 having rounded edges and secured to the webbing by a loop threaded through the member and doubled over to receive the stitches of heavy thread. The hooks at each end of the tightener are inserted in the respective eyelets.

Thus, as seen in FIG. 1, when all the connections have been made, including the insertion of the webbing in the slot of the adaptor or webbing hook, there are in effect two lengths of the webbing held at one end by the loop at the clevis 20 and at the other end by a similar loop at the rounded slot 8, in the adaptor 6. The tightener can pull the adaptor as close as desired to the clevis 20 and thus tighten both lengths of the webbing equally because there is a sliding or slipping effect at the rounded terminal positions.

All that remains is to attach the hook 19 to the equipment and as shown, in the case of a truck, the rear axle or housing may be looped by the hook and its chain. The hook can also be attached to the tiedown ropes or straps encircling other types of equipment or material.

It will be noted that on account of the looping effect at the clevis 20 and at the adaptor or webbing hook 6, there is no loose end of fabric in contact with metal edges. The webbing is of a closed configuration formed of two lengths, except for the belt tightening device. The use of the improved webbing hook or adaptor serves the dual purpose of providing the surface for the upper loop or webbing and also for making possible a metal to metal connection between a hook 19 or other attachment to a load and the main part of a webbing tiedown assembly.

The lever 27 of the tightener is then operated to apply pressure until all parts of the tiedown assembly are taut. To remove the load from the platform at its air drop destination, it is necessary merely to loosen the tightener and unhook the assembly from the points 24, 29. The webbing can be removed from the adaptor by sliding it through the space 12 (FIG. 3). The slip noose formed by the chain and hook 19 may then be removed from the load.

I claim:

1. Apparatus for securing an air drop vehicular load to a platform having metal rails along its edges with strap engaging tie down clevices attached to the rails, comprising a chain member having a grab hook at one end adapted to engage a chain link for securing the chain to the axle shaft housing of the vehicle load; said chain member having a strap engaging hook member at the other end thereof; said hook member having an aperture adapted to receive a chain link and an elongated slot with an opening at one edge for receiving a strap; a strap member of a woven webbing material engaging the tie down clevis secured to the rail and the elongated slot in the hook member and having eyelet members with strap engaging loops at each end thereof; and a strap tightener having hook members at each end engaging to the eyelet members at the ends of the strap.